(12) United States Patent
Gullberg et al.

(10) Patent No.: US 12,206,764 B2
(45) Date of Patent: Jan. 21, 2025

(54) METHOD FOR SECURING AN EXECUTION OF A LOCAL APPLICATION AND CORRESPONDING FIRST AND SECOND USER DEVICE AND SYSTEM

(71) Applicant: THALES DIS FRANCE SAS, Meudon (FR)

(72) Inventors: Peter Gullberg, La Ciotat (FR); Gregory Vigroux, La Ciotat (FR); Eric Garreau, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 266 days.

(21) Appl. No.: 17/622,311

(22) PCT Filed: Jun. 18, 2020

(86) PCT No.: PCT/EP2020/066984
§ 371 (c)(1),
(2) Date: Dec. 23, 2021

(87) PCT Pub. No.: WO2021/001164
PCT Pub. Date: Jan. 7, 2021

(65) Prior Publication Data
US 2022/0247555 A1  Aug. 4, 2022

(30) Foreign Application Priority Data

Jul. 1, 2019 (EP) .................................. 19305884

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3247* (2013.01); *H04L 9/3271* (2013.01)

(58) Field of Classification Search
None
See application file for complete search history.

(56) References Cited

U.S. PATENT DOCUMENTS

| 2013/0263212 A1 | 10/2013 | Faltyn et al. |
| 2016/0134629 A1 | 5/2016 | Rombouts et al. |
| 2020/0403782 A1* | 12/2020 | Riou ..................... G06F 21/602 |

OTHER PUBLICATIONS

International Search Report (PCT/ISA/210) and Written Opinion (PCT/ISA/237) mailed on Aug. 14, 2020, by the European Patent Office as the International Searching Authority for International Application No. PCT/EP2020/066984 (WO2021/001164)—[12 pages].

* cited by examiner

*Primary Examiner* — Syed A Roni

(57) ABSTRACT

A method for securing an execution of a local application is provided and includes the steps of requesting, from the first user device, to execute, by the local application, at least one operation; generating, by the first user device, by executing the local application, a first challenge; sending, from the local application, to a second user device, the first challenge and a predetermined identifier relating to an associated key pair; and retrieving, by the second user device, based on the key pair identifier, a private key; generating by the second user device, a first response, by using the first challenge and the private key; and sending from the second user device to the local application, the first response. Other embodiments are disclosed.

10 Claims, 5 Drawing Sheets

METHOD FOR SECURING AN EXECUTION OF A LOCAL APPLICATION AND CORRESPONDING FIRST AND SECOND USER DEVICE AND SYSTEM

FIELD OF THE INVENTION

The invention relates generally to a method for securing an execution of a local application.

Moreover, the invention also pertains to a first user device for securing an execution of a local application.

The present invention is notably applicable to a mobile radio-communication field in which the first user device that supports the local application includes a user terminal, like e.g., a (mobile) (tele)phone(s).

Furthermore, the invention also relates to a second user device for securing an execution of a local application. The second user device may include a user authentication device, such as a Fast IDentity Online (or FIDO) type authentication device.

Finally, the invention relates to a system for securing an execution of a local application as well.

STATE OF THE ART

It is known to use a FIDO authentication device, such as a biometric reader, that is connected to a Personal Computer (or PC), to authenticate a user to a (remote) server. A client is installed on a (web) browser of the PC, as a (user) device. The FIDO authentication is accessed through the browser by using a standard Application Programming Interface (or API). To allow the user authentication, there is previously, for the user, a registration phase with the (on-line) server. During the registration phase, the device generates a key pair that includes a private key and an associated public key. The device sends the public key to the server. The server registers the public key. The device proves to the server that the device owns the private key by signing a challenge. The server verifies that the (received) signed challenge is valid by using the registered public key. Only if the signed challenge is valid, the server authenticates successfully the user.

However, such a known solution implies that the device is on-line, so as to secure access to a service.

There is a need of a solution that allows, in an alternative manner, securing access to a service, when the device is off-line.

SUMMARY OF THE INVENTION

The invention proposes a solution for satisfying the just herein above specified need by providing a method for securing an execution of a local application.

According to the invention, a first user device storing the local application, the method comprises the following steps. Requesting, from a user to the first user device, to execute, by the local application, at least one operation. Generating, by the first user device, by executing the local application, a first challenge. Sending, from the local application, to a second user device, the first challenge and a predetermined identifier relating to an associated key pair. Retrieving, by the second user device, based on the key pair identifier, a private key. Generating, by the second user device, a first response, by using the first challenge and the private key. Sending, from the second user device to the local application, the first response. Verifying, by the local application, whether the received first response does or does not match a first signature, by using the first challenge and a public key associated with the key pair identifier, the first signature being a signature of the first challenge by the second user device. And carrying out, by the local application, only if the received first response matches the first signature, the at least one operation.

The principle of the invention consists in requesting, from a user to a first user device, to execute, by a supported local application, one or several operations. Then, the local application determines and sends to a second user device a first challenge along with a predefined key pair identifier. The second user device gets, based on the key pair identifier, a corresponding private key. The second user device determines a first response by using the first challenge and the private key. Then, the second user device sends, to the (requesting) local application, the first response. The local application checks whether the first response does or does not correspond to a first signature relating to the first challenge. Only if the first response corresponds to the first signature relating to the first challenge, the (requested) operation(s) is(are) carried out by the first user device by executing the local application.

Thus, the operation(s) is(are) only carried out when the cooperating second user device, as the local application interlocutor, owns the private key that is associated with the key pair identifier.

The local application is(are) bound or linked to the presence of the second user device that has to cooperate with the local application, so as to be executed.

It is noteworthy that the local application may be either on-line or off-line, i.e. connected or not to a server respectively during such a service access solution, as the invention solution.

The local application accesses the public key associated with the key pair identifier either, when receiving, from the second user device, the first response or, prior to the reception of the first response, such as during a user enrolment or registration phase at a remote server side.

The invention solution is secure, since the local application validates the first challenge signature by using the public key, proving thus that the local application interlocutor possesses, by signing the first challenge, the corresponding private key.

Furthermore, the second user device does not expose any secret data as the second user device signs the first challenge by using the private key which is kept stored only at the second user device side.

The invention solution is simple and efficient to secure access to the local application.

The associated first challenge signature is only generated and sent to the local application when the second user device authorizes preferably to unlock and use the private key.

To authorize to unlock the private key to be used for signing the first challenge, the second user device authenticates preferably (successfully) the user.

According to an additional aspect, the invention is a first user device for securing an execution of a local application.

According to the invention, the first user device comprising means for storing the local application, the first user device is configured to be requested, from a user, to execute, by the local application, at least one operation. The first user device is configured to generate, by executing the local application, a first challenge. The first user device is configured to send, from the local application to a second user device, the first challenge and a predetermined identifier relating to an associated key pair. The first user device is configured to receive, from the second user device to the local application, a first response. The first user device is configured to verify, by the local application, whether the received first response does or does not match a first signature, by using the first challenge and a public key associated with the key pair identifier, the first signature being a signature of the first challenge by the second user device. And the first user device is configured to carry out, by the local application, only if the received first response matches the first signature, the at least one operation.

The first user device may include a user terminal, such as a PC or a (mobile) phone.

According to a further aspect, the invention is a second user device for securing an execution of a local application.

According to the invention, the second user device is configured to receive, from the local application, a first challenge and an identifier relating to an associated key pair. The second user device is configured to retrieve, based on the key pair identifier, a private key. The second user device is configured to generate a first response, by using the first challenge and the private key and send, to the local application, the first response.

The second user device may include a ConTact (or CT) or ConTact-Less (or CTL) (hardware) token or Secure Element (or SE).

Within the present description, an SE is a smart object that includes a chip(s) that protect(s), as a tamper resistant component(s), access to stored data and that is intended to communicate data with outside, such as an external device (s), like e.g., an SE host device, such as a phone, a server(s) and/or a user.

According to still a further aspect, the invention is a system for securing an execution of a local application.

According to the invention, the system comprises a first user device and a second user device and the first user device includes the aforementioned first user device and the second user device includes the aforementioned second user device.

The system may include a Terminal Equipment (or TE) including a phone, as a first user device, and an SE, as a second user device.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered a case in which the invention method for securing a local application is implemented by a phone, as a first user device, and a watch, as a second user device, that cooperates with the local application. The local application, as a SoftWare (or SW) component, does not need to cooperate with another HardWare (or HW) device, at the client side, like e.g., an SE, so as to carry out securely a requested operation(s) that is(are) described infra.

According to another embodiment (not represented), the invention method for securing a local application is implemented by a first user device, as an SE host device, a second user device and an SE, as a third user device, that also cooperates with the local application. According to such an embodiment, the SE supports the local application to carry out the requested operation(s) that is(are) described infra by adding a secure data storage and a secure data processing in the SE. The SE may include an incorporated chip, like e.g., an embedded Universal Integrated Circuit Card (or eUICC) or an integrated Universal Integrated Circuit Card (or iUICC), within a terminal, as an SE host device, or a chip that is communicatively coupled to the terminal and included in a smart card (or another medium). The chip may be fixed to or removable from its host device. As removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device. The invention does not impose any constraint as to a kind of the SE type.

Naturally, the herein below described embodiment is only for exemplifying purposes and is not considered to reduce the scope of the invention.

Figure 1:
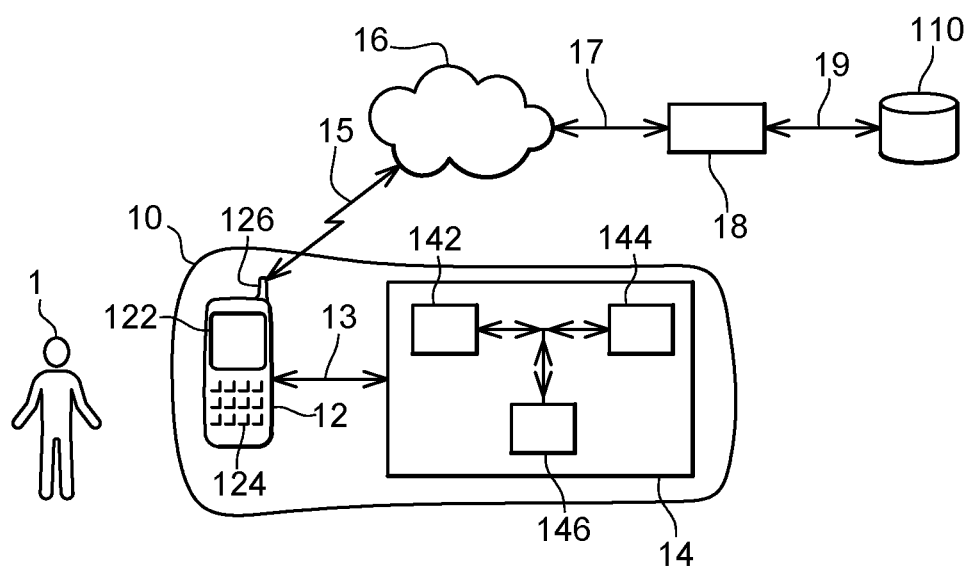
FIG. 1 illustrates a simplified diagram of an embodiment of a system comprising a (smart) watch and a phone coupled hereto and supporting a local application that is configured to carry out an operation(s), further to a user request and only after having validated that the watch owns a private key, according to the invention.

FIG. 1 shows schematically, at a client side, a system 10 including a (mobile) phone 12 and a (smart) watch 14 and, at the server side, a (remote) server 18.

The phone 12, as a first user device, is used by a user 1.

Instead of a phone, the first user device may include a PC, a tablet, a desktop computer, a laptop computer, a mediaplayer, a game console, a tablet, a netbook, a smart jewel (or jewelry), a handset and/or a Personal Digital Assistance (or PDA). The first user device may incorporate or cooperate with a baseband (radio) processor(s). The first user device may include any other device including means for processing data, comprising or being connected to communication means for exchanging data with outside, and comprising or being connected to means for storing data.

The phone 12 includes one or several (micro)processors (and/or a (micro)controller(s)) (not represented), as data processing means, comprising and/or being connected to one or several memories, as data storing means, comprising and/or being connected to means for interfacing with the concerned user 1, such as a Man Machine Interface (or MMI), and comprising and/or being connected to an Input/

Output (or I/O) interface(s) (not represented) that are internally all connected, through an internal bidirectional data bus.

The phone MMI may include a display screen(s) 122, a keyboard(s) 124, a loudspeaker and/or a camera (not represented).

The phone MMI allows the user 1 to interact with the phone 12 and in particular with an invention local application supported by the phone 12.

The I/O interface(s) may be connected to an antenna(s) 126 for wirelessly exchanging data with outside.

The phone 12 is connected to or includes preferably CTL communication means for exchanging data with outside, like e.g., preferably through a first Radio-Frequency (or RF) link(s) 13, with the watch 14 and possibly, via a Wi-Fi Hotspot (not represented), as a Network Access Point (or NAP), with the server 18.

Within the present description, the adjective "CTL" denotes notably that the communication means communicates via one or several Short Range (or SR) type RF links.

The SR type RF link(s) may be related to any CTL technology that allows the phone 12 to exchange locally data, through a CTL link(s) 13, with a local device, such as the watch 14, or, possibly via a NAP, with the server 18. The SR RF(s) may be related to e.g., a Near Field Communication (or NFC), a Wi-Fi, a ZigBee, a BluetooTH (or BTH), a Bluetooth Low Energy (or) BLE type communication technology(ies) and/or the like.

Alternatively, i.e. instead of a CTL link(s), or additionally, the phone 12 is connected, through a contact(s), like e.g., a USB type interface, to the watch 14.

The phone antenna(s) 126 allow(s) the phone 12 to communicate, preferably through a second RF link(s) 15, as a wireless link(s), via a communication network(s) 16, data with the server 18.

The second RF may be fixed at several hundreds of MHz, e.g., around 850, 900, 1800, 1900 and/or 2100 MHz, as a Long Range (or LR) type RF(s).

The communication network(s) 16 may include a mobile radio-communication network(s). Additionally or alternately, the communication network(s) 16 may include a WLAN (acronym for "Wireless Local Area Network"), an Internet and/or Intranet type network(s). The communication network(s) 16 may be accessed, from the phone 12, through an SR radio-communication link(s).

Alternatively, i.e. instead of a wireless and/or CTL link(s), or additionally, the phone 12 is connected, through a wire(s) or a cable(s) (not represented), to the server 18.

The phone memory(ies) may include one or several volatile memories and one or several non-volatile memories.

The phone memory(ies) may store a first and/or a last name(s) relating to the user 11, as a user IDentifier(s) (or ID(s)), an International Mobile Equipment Identity (or NEI), a Mobile Subscriber Integrated Services Digital Network number (or MSISDN), an Internet Protocol (or IP) address, an International Mobile Subscriber Identity (or IMSI), an email address(es) and/or the like, as a phone 12 ID(s).

Alternately, instead of the phone 12, a chip that is connected or communicatively coupled to the phone 12 stores at least a part of the user ID(s) and/or at least a part of the phone ID(s).

The phone 12 (or the cooperating chip or SE) memory (ies) store(s) preferably a Uniform Resource Locator (or URL) and/or a Uniform Resource ID (or URI), as a server 18 ID(s). The server ID(s) allow(s) identifying uniquely and addressing the server 18.

The phone memory(ies) stores an Operating System (or OS) and the invention local application.

The local application allows carrying out, on-line and/or off-line (i.e. not connected to the server 18 side), one or several operations to be requested by the user 1.

The operation(s) may include one or several cryptographic operations, like e.g., a digital signature generation, an email decryption, a One-Time Password (or OTP) generation, a cryptogram generation and/or any other operation (s).

The cryptographic operation(s) use(s) preferably one or several secure data items or assets, such as e.g., a secret cryptographic key(s), a seed(s), an identifier(s) and/or secret data. The secure assets are stored securely at the phone 12 and are preferably opaque, i.e. hidden from outside. The secure assets may be also stored at the server side and shared with the phone 12, like e.g., during a previous (user) enrolment or registration phase, from the server 18 side.

The local application may include one or several cryptographic algorithms that are implemented through e.g., a White-Box Cryptography (or WBC) technique, so as to carry out securely the cryptographic operation(s).

The WBC technique is a SW protection to keep a cryptographic asset(s), such as a cryptographic key, secure, i.e. secret. The WBC technique allows performing one or several cryptographic operations in an environment that is subject to attacks without revealing any portion of secret information, such as a secret cryptographic key. The WBC technique allows ensuring the confidentiality of the cryptographic asset(s) when a cryptographic computation or operation is performed on the phone 12, as a non-trusted device. Under the White-Box (or WB) model, the cryptographic operation uses, instead of the cryptographic asset(s), a WB asset(s). The WB asset(s) is(are) generated preferably at least in part from the cryptographic asset(s), in such a way that an attacker who retrieves the WB asset(s) is not able to retrieve the corresponding cryptographic asset(s). The WB assets are specific to the user 1. The WB assets may include a secret cryptographic key, as a WB key, and associated data, as WB data. The WB key is related to the cryptographic key while being separate from the cryptographic key. The WB key is preferably kept protected and secret, i.e. not accessible from outside. The WBC technique uses, instead of the cryptographic asset(s), the WB asset(s) to carry out one or several cryptographic operations, so as not to reveal at least a part of the cryptographic asset(s).

The local application may include at least in part a secure execution application.

The secure execution application is securely executed in e.g., an enclave. For instance, a code (or program instructions) relating to the secure execution application is obfuscated, i.e. secured, and/or data to be used by the secure execution application is stored in a secure storage that is only readable, i.e. can only be interpreted, by the enclave. To access the data to be used by the secure execution application, the enclave may have to "decrypt" corresponding data, i.e. by using one or several secure assets, such as a secret decryption key and/or a secret reading table providing information that allows interpreting the concerned data to be decrypted.

The secure execution application is preferably able to generate, when executed, on-board, an ID that is unique and specific to the phone 12, as a phone and device ID. The device ID is dependent on one or several HW components and/or one or several SW components included in the phone 12. The phone ID is a phone fingerprint that allows identifying the phone 12, as the concerned device. The phone ID is preferably securely stored in a secure storage on the phone 12 (or in an external device cooperating with the phone 12, such as an SE connected or coupled hereto).

The local application preferably the secure execution application, is arranged to send, when executed, to an interlocutor, such as e.g., the server 18, the phone ID, so that the addressee is able to exchange securely data with the local application by using an encryption key that is derived or generated by using the received phone ID. The local application, preferably the secure execution application, is configured to generate, when executed, a decryption key by using the (generated) phone ID and a predetermined (and stored) key generation algorithm.

The local application, preferably the secure execution application, is adapted to generate, when executed, an (authentication) challenge.

To generate the challenge, the local application, preferably the secure execution application, uses a predetermined challenge generation algorithm, such as a random generation algorithm, and possibly predefined input data to be used as input to the challenge generation algorithm. The input data may depend on optional data, such as a value relating to a transaction amount, to be used for carrying the (requested) operation(s), such as a transaction signature.

The local application, preferably the secure execution application, is arranged to transmit, when executed, to the watch 14 a request for signing at least the challenge accompanied with the challenge possibly in association with (i.e. concatenated with) the input data. The challenge signing request is preferably accompanied with a predetermined ID relating to an associated key pair. The key pair ID has been preferably registered, during a previous (user) enrolment or registration phase, along with an associated public key for the concerned user account. The registered public key is preferably used for knowing whether a corresponding challenge response is or is not valid, i.e. the challenge response is or is not a challenge signature that has been generated by the local application interlocutor by using the private key that is associated with the registered public key. If the challenge response is valid, then the local application knows that the local application interlocutor owns the concerned private key and is therefore genuine, i.e. authentic.

The local application, preferably the secure execution application, is adapted to receive, when executed, from the watch 14, as a challenge signature, a response to the challenge signature request. The challenge signature request response may be accompanied with optional data, as additional data. The optional data may include data that has been used for generating the challenge.

The local application, preferably the secure execution application, is adapted to check, when executed, whether the challenge (signature request) response does or does not match the challenge signature by using the challenge and a public key. The local application, preferably the secure execution application, gets the public key by either receiving the public key from the watch 14 in association with the challenge response or retrieving the registered public key based on the sent key pair identifier. If the challenge response matches the challenge signature, then the local application authenticates the local application interlocutor. Otherwise, i.e. if the challenge response does not match the challenge signature, the local application fails to authenticate the local application interlocutor, i.e. the local application interlocutor is not the one the local application interlocutor claims to be.

The local application, preferably the secure execution application, is arranged to carry out (when executed), only if the challenge response matches the challenge signature, the operation(s) that has(have) been requested by the user 1.

To carry out the operation(s), the local application, preferably the secure execution application, uses advantageously a secure asset(s) and possibly optional data, such as a value relating to an amount of a transaction.

The secure asset(s) has(have) been preferably previously loaded at the phone 12 side, during a (user) enrolment or registration phase, from e.g., the server 18 side, as described below in relation with FIGS. 4 and 5, on the basis of a personalization data item(s) originating from or through the server 18.

The phone 12 is connected or communicatively coupled to one or several chips included in the watch 14, as a chip medium and a second user device.

Alternately, the chip(s) include(s) a Trusted Execution Environment (or TEE), as a secure area of a phone (or terminal) processor and a secured runtime environment.

Alternatively (i.e. instead of being separate from the phone 12), the watch 14 chip(s) is(are) incorporated, possibly in a removable manner, within a Printed Circuit Board (or PCB) of the phone 12, as a chip host device. The watch 14 chip(s) may also incorporate at least part of the phone component(s), like e.g., a baseband processor, an application processor(s) and/or other electronic component(s).

The watch 14 chip(s) is(are) preferably included within an SE, as a tamper resistant component.

The SE may nevertheless have different form factors.

Instead of being embedded in a watch 14, the SE chip(s) may be carried by a medium, such as a smart card or a dongle.

The invention does not impose any constraint as to a kind of the SE.

As removable SE, it may be a smart dongle of the USB type, a (micro) SD type card, a MMC type card, a SIM type card or any format card to be coupled to a chip host device.

The watch 14, as a portable and mobile SE, belongs preferably to the user 1.

The (chip) medium may include, instead of the watch 14, a headset or the like, as an accessory of the phone 12 that is able to exchange with the phone 12. The (chip) medium may include any other wearable device, like e.g., a camera, a clothing, a jewel (or jewelry) of the (phone) user 1 or anything that may integrate the SE chip(s), which the user 1 wears or accesses.

The watch 14 includes one or several chips comprising a (micro)processor(s) 142 (and/or a (micro)controller(s)), as data processing means, a memory(ies) 144, as data storing means, and one or several I/O interfaces 146 that are internally all connected, through an internal bidirectional data bus 143, to each other.

The I/O interface(s) 146 allow(s) communicating data from the internal SE chip(s) to the chip exterior and conversely.

The memory 144 stores an OS and an invention signature generation application.

The watch 14 is preferably able to generate, on-board, one or several (user) private keys by using, for each private key to be generated, a predetermined key generation algorithm and secret data.

To generate the private key(s), the watch 14 authorizes previously preferably to trigger a private key generation, only after having successfully authenticated the user 1.

To authenticate the user 1, the watch 14, as a user authenticator, checks or lets another cooperating device (connected or coupled to the watch 14) check whether the user 1 is or is not successfully authenticated. The watch 14 is equipped with HW and/or SW means for authenticating its user, such as one or several biometric sensors, that allows authenticating (or not) the user. To authenticate the user 1, the watch 14 (or a cooperating device connected or coupled to the watch 14) compares entered and/or submitted user credentials to reference user credentials. The watch 14 (or the cooperating device) stores preferably the reference user credentials. If the entered and/or submitted user credentials matches the reference user credentials, then the watch 14 authenticates successfully the user 1. Otherwise, i.e. if the entered and/or submitted user credentials does not match the reference user credentials, the watch 14 fails to authenticate the user 1.

The reference user credentials may include, e.g., a reference Personal Identification Number (or PIN), reference user biometric data, such as a (user) reference fingerprint(s), a (user) reference facial print(s) and/or a (user) reference iris print(s), and/or any reference user authentication data.

The memory 144 stores preferably the (generated) private key(s).

The private key(s) is(are) known only to the watch 14 and kept secret, i.e. private. In other words, the private key(s) is(are) kept within the watch 14 and is therefore not sent to any external device, such as the phone 12 and/or the server 18.

The private key(s) may include a temporary key(s) or a permanent key(s).

The private key(s) may be used for generating a corresponding (digital) signature(s) while using data to be signed that is received from outside, such as from the server 18 or the local application supported by the phone 12.

The watch 14 is preferably able to generate, on-board, one or several public keys by using, for each public key, a predetermined key generation algorithm and a corresponding (on-board generated) private key. For each pair of keys, i.e. a private key and a corresponding public key, the watch 14 is preferably able to generate, on-board, an associated ID relating to the concerned key pair. The watch 14 is able to send, to one or several external devices, such as the phone 12 and/or the server 18, the (generated) public key(s) and possibly its(their) corresponding key pair ID(s).

The watch 14 (and more exactly a signature generation application) is adapted to generate one or several (data) signatures based, each, on a private key and received data, like e.g., a challenge. The private key may be the only one that is accessible to the watch 14 or one that has to be identified or selected among several stored private keys.

To generate the data signature, the watch 14 is preferably able to receive, from an external device, besides a request for signing data and data to be signed, a key pair ID, so as to select a corresponding (associated) private key.

To generate the data signature, the watch 14 is preferably arranged to authorize to unlock the private key to be used for signing received data to be signed, only after having successfully authenticated the user 1.

To authorize to unlock the concerned private key, the watch 14 is provided with a button, a user fingerprint sensor and/or the like, as means for controlling, by the user, when actuated, depressed or controlled by the user, an unlocking of the concerned private key.

To generate the data signature, the watch 14 uses the received data and the identified private key. The private key to be used may be identified or retrieved based on the key pair ID received from an external entity, such as the server 18 or the local application supported by the phone 12.

The watch 14 is able to transmit to a data signing requester, preferably only if the user 1 is successfully authenticated, the generated data signature.

The watch 14 may be further configured to issue one or several attestations, as a vendor (data) signatures, based, each, on received data, like e.g., a challenge, and a (private) vendor key that is stored or accessible by the watch 14. The vendor is a company that has manufactured or provides the user 1 with the watch 14. The vendor key may be the only one that is accessible to the watch 14. Each attestation may be verified by a watch interlocutor that accesses a public key relating to the concerned vendor, as a public vendor key. The watch 14 may transmit to the watch interlocutor the (generated) attestation along with the public vendor key, so that the watch interlocutor is able to verify the validity of the attestation by using the challenge, as the data sent by the watch interlocutor to the watch 14, and the public vendor key. Such an attestation validation by the watch interlocutor allows proving that the watch 14 is attested by the concerned vendor to have manufactured or provided the considered watch 14 to the user 1.

The watch 14 is connected or coupled, possibly through the phone 12 (and more exactly the local application), to the server 18 side.

The server 18 is connected, over a first (bi-directional) link 15 and a second (bi-directional) link 17, through the communication network(s) 16, to the phone 12 that plays a role of a client device(s).

In a particular embodiment, there is a single server 18 that is represented at the server side. The server 18 is configured to carry out a registration operation and a personalization operation for one or several user accounts.

According to another embodiment (not represented), instead of a single server, two or more servers are involved to carry out notably a registration operation and/or a personalization operation that are both carried out by the server 18.

The server 18 may include a Hardware Security Module (or HSM) type entity.

The server 18 is identified by a URI1, a URL1, an IP address 1 and/or the like, as a server 18 ID(s).

The server 18 may be operated by a Mobile Network Operator (or MNO), a Mobile Virtual Network Operator (or MVNO), a bank operator, a service provider or on its behalf.

The server 18 may be accessible, Over-The-Air (or OTA), Over-The-Internet (or OTI) and/or Over The Cloud (or OTC), over the communication network(s) 16, from one or several client devices that support, each a local application to be personalized.

Each client device may, each, prior to executing a corresponding supported local application either on-line or off-line, request to be provisioned with one or several personalization data items.

The server 18 is hosted by a computer including a processor(s) (not represented), as data processing means, data storing means and one or several I/O interfaces for exchanging data with outside.

The server 18 is connected, over a third (bi-directional) link 19, to a database 110.

The server 18 is used preferably to register securely, for each user account, a public key preferably in association with a corresponding key pair ID that both originate from or through a client device (e.g., from a second user device, such as the watch 14), as a user registration or enrolment operation.

The database 110 is used for registering, for each user client account, associated data. The registered data is, at least in part, specific to the concerned user.

The server 18 is preferably configured to receive a user registration request for registering a public key preferably along with an associated key pair ID. Such a user registration request may originate, through a (registered) first user device (such as the phone 12), from a second user device (such as the watch 14).

The user registration request includes or is accompanied preferably with submitted user credentials, such as a user name and an associated password and/or an OTP. The server 18 may be adapted to receive at least a first part of the user credentials, through a first channel, and possibly at least a second part of the user credentials, through a second channel.

The first channel may include a HyperText Transfer Protocol (Secure) (or HTTP(S)) type channel.

The second channel, as a channel separate from the first channel, may include a Short Message Service (or SMS) type channel.

The server 18 is preferably arranged to check whether the (received) submitted user credentials does or does not match predefined reference user credentials that is associated for each client user account, as user client account data. The reference user credentials is preferably registered within the database 110 and accessible from the server 18.

The server 18 is preferably adapted to generate, preferably only if the submitted user credentials matches the reference user credentials, i.e. only if the concerned user is successfully authenticated, a first challenge.

The server 18 is arranged to send, to the second user device, a first challenge signature request along with the (generated) first challenge.

The server 18 is configured to receive, from the second user device, a response to the first challenge signature request. The first challenge (signature request) response is preferably accompanied with a public key and possibly a corresponding key pair ID. The key pair ID allows the server 18 to identify a key pair that is used at the client device side and an associated public key.

The server 18 is arranged to check whether the first challenge response does or does not match the first challenge signature by using the first challenge and the public key. If the first challenge response matches the first challenge signature, then the server 18 authenticates successfully the server 18 interlocutor. Otherwise, i.e. if the first challenge response does not match the first challenge signature, the server 18 fails to authenticate the server 18 interlocutor, i.e. the server 18 interlocutor is not the one the server 18 interlocutor claims to be.

The server 18 is configured to carry out, only if the first challenge response matches the first challenge signature, a registration of the received public key and possibly the corresponding received key pair ID. Such a registration consists in storing, within the database 110, the received public key and possibly the received key pair ID, for the concerned user client account.

The user client account may be associated with an IMSI (s), a URI(s), a URL(s), an email address(es), an IP address (es), an MSISDN(s) and/or the like, as one or several IDs relating to an associated first user device(s) that may be used at the client device side.

The first user device ID(s) allow(s) identifying uniquely a corresponding client device to be addressed from or through the server 18.

Each user client account is associated with one or several IDs of an associated client device(s), such as a first user device ID and a second user device ID, as data relating to each user client account.

The user client account data may further include one or several IDs of the concerned associated user.

The user client account data may include, for each user client account, user data, such as reference user credentials or reference user authentication data, The user client account data includes a public key preferably in association with a corresponding key pair ID.

The public key is used for verifying a corresponding (data or digital) signature received, through the concerned first user device, as a client device, possibly from a second user device cooperating with the first user device.

The server 18 is preferably configured to receive, from the client side, an enrolment or registration request for registering a first user device (and more exactly its local application).

Such a registration request may originate, from or through a (registered) first user device (such as the phone 12) (and more exactly its local application), preferably under control of the user of the first user device. The registration request may include or be accompanied with a (first user) device ID and/or a user ID, such as an IMSI or the like, that allows the server 18 to identify a user account. The registration request may include or be accompanied with submitted user credentials, such as a user name and an associated password and/or an OTP.

The server 18 is preferably arranged to check whether the (received) submitted user credentials does or does not match predefined reference user credentials that is associated for each client user account, as user client account data. The reference user credentials is preferably registered within the database 110 and accessible from the server 18.

The server 18 is preferably adapted to generate, preferably only if the submitted user credentials matches the reference user credentials, i.e. only if the concerned user is successfully authenticated, a second challenge.

The server 18 is arranged to get, based on the received ID(s) relating to the client device and/or the user, and the associated user account, from the database 110, the public key and possibly the associated key pair ID, as (registered) user data for the identified user client account.

The server 18 is configured to send, to the identified local application, a second challenge signature request along with the second challenge in association preferably with the associated key pair ID.

The server 18 is arranged to receive, from the client side (and more exactly the local application), a response to the second challenge signature request. The second challenge (signature request) response may also include or be accompanied with the public key and/or the associated key pair ID. The public key and/or the key pair ID allow(s) the server 18 to further verify that the second challenge response is valid (or not), as an additional security verification.

The server 18 is arranged to check whether the second challenge response does or does not match the second challenge signature by using the second challenge and the public key, namely the public key that has been previously registered at the server 18 side. If the second challenge response matches the second challenge signature, then the server 18 authenticates successfully the server 18 interlocutor. Otherwise, i.e. if the second challenge response does not match the second challenge signature, the server 18 fails to authenticate the server 18 interlocutor, i.e. the server 18 interlocutor is not the one the server 18 interlocutor claims to be.

The server 18 is configured to get, only if the second challenge response matches the second challenge signature, a retrieval of one or several predefined secure assets. Such a secure asset retrieval consists in getting or retrieving, from the database 110, one or several registered user assets, as a secret asset(s), for the concerned user client account.

The server 18 is used preferably to generate or let another server (connected to the server 18) generate, based on the retrieved secret asset(s), such as WB assets, like e.g., a WB key and associated WB data, one or several personalization data items.

The personalization data item(s) has(have) been generated, by or through the server 18, based preferably on a secure asset(s).

The data registered within the database 110 may include the personalization data item(s) possibly in association with a secure asset(s) that has(have) been used at least in part to generate the personalization data item(s).

The server 18 is used preferably to transmit securely, to the client device (such as the phone 12), one or several personalization data items for the user 1 account, as a personalization operation.

Besides generated personalization data item(s), the server 18 may transmit other data item(s) that is(are) registered for the user account, such as user data.

Figure 2:
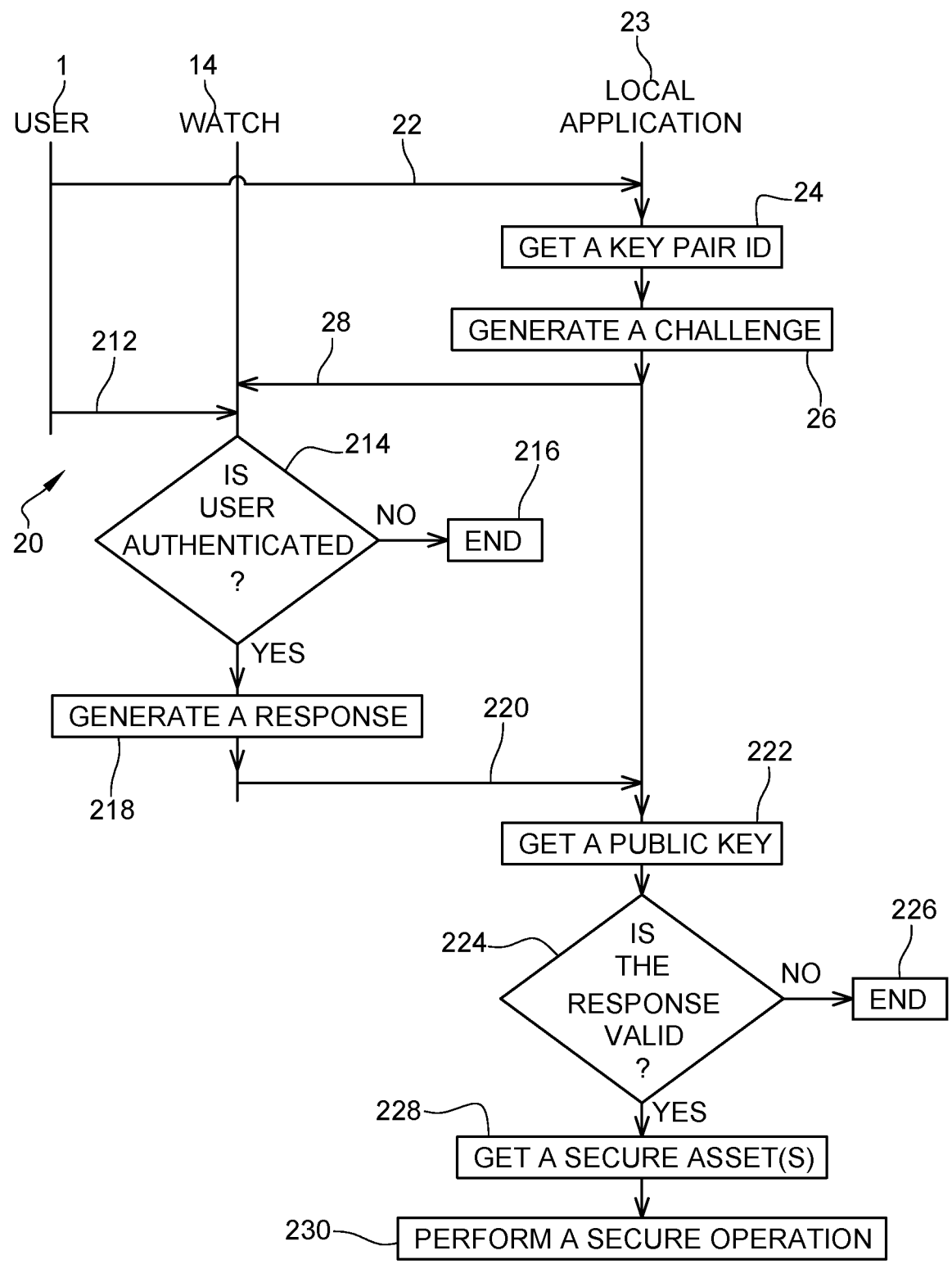
FIG. 2 illustrates an embodiment of a message flow between the user, the local application and the watch of FIG. 1, so that the local application carries out, based on a user control, only after a validation of a first challenge signature originating from the watch, the operation(s), according to the invention.

FIG. 2 depicts an exemplary embodiment of a message flow 20 that involves the user 1, the (user) phone 12 and the watch 14, so that a secure operation is carried out, when at least the watch 14 is successfully authenticated.

In the described example, it is assumed that the user 1 wears the watch 14.

It is further assumed that the user 1 interacts, by using the phone MMI (not represented), with the Local Application (or LA) 23 supported by the phone 12.

It is further assumed that the user 1 desires to perform off-line, i.e. while not being connected to the server 18 side, a decryption of a received email, as a cryptographic or secure operation that is securely carried out by the LA 23.

Alternately, i.e. instead of being carried out off-line, the secure operation is carried out on-line, i.e. while being connected to the server 18 side.

It is still assumed that the LA 23 has been previously personalized, i.e. has received, e.g. from the server 18 side, a public key, a corresponding key pair ID and a secure asset(s), as personalization data items.

Firstly, the user 1 requests 22, through the phone MMI, to the phone 12, to carry out e.g., an email decryption, as a local and secure operation.

Once the phone 12 has received the request for carrying out the secure operation, the phone 12 executes the LA 23, as a Secure Execution Environment (or SEE) included in the phone 12.

The LA 23, when executed (by the phone 12), gets or retrieves 24, from the database 110, a key pair ID.

The LA 23 generates 26 a challenge.

To generate the challenge, the LA 23 may use additional data, as an input(s) of an algorithm for generating the challenge.

The LA 23 sends 28, to the watch 14, the (generated) challenge along with the (retrieved) key pair ID.

The LA 23 and the watch 14 exchange, through a communication application (not represented) that is supported by the phone 12, by using a CTL communication technology.

Optionally, in addition to the challenge and the key pair ID, the LA 23 sends, to the watch 14, preferably in a concatenated manner with the challenge, additional data.

The additional data may be related to or depend on the secure operation to be carried out. For instance, the additional data includes an encrypted email (to undergo the email decryption) or a value of an amount of a transaction (to undergo a signature operation) to validate a corresponding requested transaction.

Such additional data transmission allows transmitting the additional data that may have been used at least in part to generate the challenge and/or that may be used, by the LA 23, at least in part to carry out the user requested secure operation. Such an additional data transmission, as an anti-replay feature, allows avoiding a replay of a response to the challenge that is sent to the watch 14 by the LA 23 is not further accompanied with additional data.

The watch 14 (and more exactly a signature application executed by the watch 14) may request the user 1 to authenticate through e.g., a biometric sensor(s) and/or other means accessible from the watch 14.

The user 1 enters and/or submits 212 preferably data, such as one or several biometric data items, by putting e.g., one or several fingers on the biometric sensor(s) that is(are) incorporated in or connected or coupled to the watch 14.

Once the watch 14 has received the entered and/or submitted data, the watch 14 verifies 214 whether the user is or is not authenticated by comparing the (received) entered and/or submitted data to reference user authentication data that is registered in the watch memory.

If the entered and/or submitted data does not match the (registered) reference user authentication data, then the watch 14 terminates 216 the execution of the launched signature process.

Otherwise, i.e. if the entered and/or submitted data matches the reference user authentication data, i.e. if the user is successfully authenticated, the watch 14 continues the execution of the launched signature process by unlocking access to the watch 14 memory(ies). Such a user authentication validation step allows ensuring that the secure operation is only performed when the user is successfully authenticated and therefore involved to authorize to carry out the concerned secure operation to be performed.

Alternately, instead of requiring a user authentication, a mere user validation, e.g., by depressing a button or the like, is used to let the user 1 have a control of the execution of the operation to be carried out. The mere user validation proves that the user owns and controls the watch 14.

To continue the execution of the launched signature process, the watch 14 gets or retrieves (not represented), based on the (received) key pair ID, a corresponding private key. Then, the watch 14 generates 218 a response.

To generate the response, the watch 14 uses the (received) challenge and the (retrieved) private key.

Optionally, the watch 14 generates (not represented) an improved or enhanced response, by using the (received) challenge, the (retrieved) private key and the (received) additional data.

Optionally, the watch 14 generates (not represented) an (operator) attestation. To generate the attestation, the watch 14 uses the (received) challenge and a (retrieved) operator private key (previously registered in the watch 14 or a device connected or coupled to the watch 14). The operator private key is associated with a corresponding operator public key.

The watch 14 sends 220 to the LA 23 the (generated) response that is possibly enhanced.

The watch 14 may send 220 to the LA 23 the possibly enhanced response along with the attestation, as a response to the challenge.

If the LA 23 receives the attestation, then the LA 23 verifies (not represented) whether the (received) attestation does or does not match an operator challenge signature by using the (sent) challenge and the operator public key. The operator public key is received from the watch 14 and/or retrieved by the LA 23 that stores or accesses the operator public key.

If the attestation does not match the operator challenge signature, i.e. if the attestation is not valid, then the phone 12 terminates 226 the execution of the LA 23, so as to forbid or deny to carry out the email decryption.

Otherwise, i.e. if the attestation matches the operator challenge signature, i.e. if the attestation is valid, the phone 12 continues the execution of the LA 23. The attestation allows proving that the concerned operator attests that the watch 14 is genuine.

Once the LA 23 has received the response after having validated, when applicable, the attestation, the LA 23 gets or retrieves 222, based on the key pair ID, from the database 110, the (associated) public key.

The LA 23 verifies 224 whether the (received) response that may be enhanced is or is not valid.

Such a response validation step allows avoiding an abusive call of the LA 23, as SEE.

To verify the validity of the (received) response, the LA 23 checks whether the response does or does not match a signature by using the (sent) challenge and the (retrieved) public key.

If the response does not match the signature, i.e. if the response is not valid, then the phone 12 terminates 226 the execution of the LA 23, so as to forbid or deny to carry out the email decryption.

Otherwise, i.e. if the response matches the signature, i.e. if the response is valid, the phone 12 continues the execution of the LA 23.

Optionally, when the (received) response is enhanced, i.e. the LA 23 has sent, besides the key pair ID, the challenge and the additional data, the LA 23 verifies the validity of the enhanced response. To verify the validity of the enhanced response, the LA 23 checks whether the enhanced response does or does not match an enhanced signature by using the (retrieved) public key, the (sent) challenge and the (sent) additional data. The enhanced signature is a signature relating to the challenge and the additional data. Such an enhanced signature originates from the watch 14.

If the enhanced response does not match the enhanced signature, i.e. if the enhanced response is not valid, then the phone 12 terminates (not represented) the execution of the LA 23, so as to forbid or deny to carry out e.g., the email decryption.

Otherwise, i.e. if the enhanced response matches the enhanced signature, i.e. if the enhanced response is valid and the LA 23 has authenticated its interlocutor, the phone 12 continues (not represented) the execution of the LA 23.

Once the LA 23 has successfully validated the response that is optionally enhanced, and, when applicable, the attestation, the LA 23 gets or retrieves 228 preferably a (previously registered) decryption key, as an opaque (or secure) asset(s) to be used for carrying out the (requested) operation.

Once the LA 23 has authenticated its interlocutor, the LA 23 allows carrying out securely the operation by using the (retrieved) opaque (or secure) asset(s). The secure asset(s) has(have) been firstly generated and stored at the server 18 side and secondly shared with the LA 23 during a personalization phase. The LA 23 is a pure SW solution that allows avoiding a use of an additional SE, as a solution that is an alternative to the LA 23.

The LA 23 carries out 230 the requested secure operation by using preferably the (retrieved) decryption key, as at least part of the concerned opaque asset(s), so as to ensure an anti-cloning feature relating to the concerned opaque asset (s). The opaque asset(s) has(have) been previously provisioned preferably from the server 18 side.

The LA 23, as a secure execution application, carries out 230 e.g., the email decryption, as a local and secure operation, by using possibly the (received) additional data, namely e.g., the encrypted email, when applicable.

The LA 23 informs preferably, through the phone MMI or an MMI accessible through the phone 12, the user 1, about the email in plain text (i.e. in a non-encrypted manner), as a result of the execution of the secure operation.

Thus, an execution of the LA 23 involves the watch 14 which requires preferably a successful user authentication to authorize the LA 23 execution.

Figure 3:
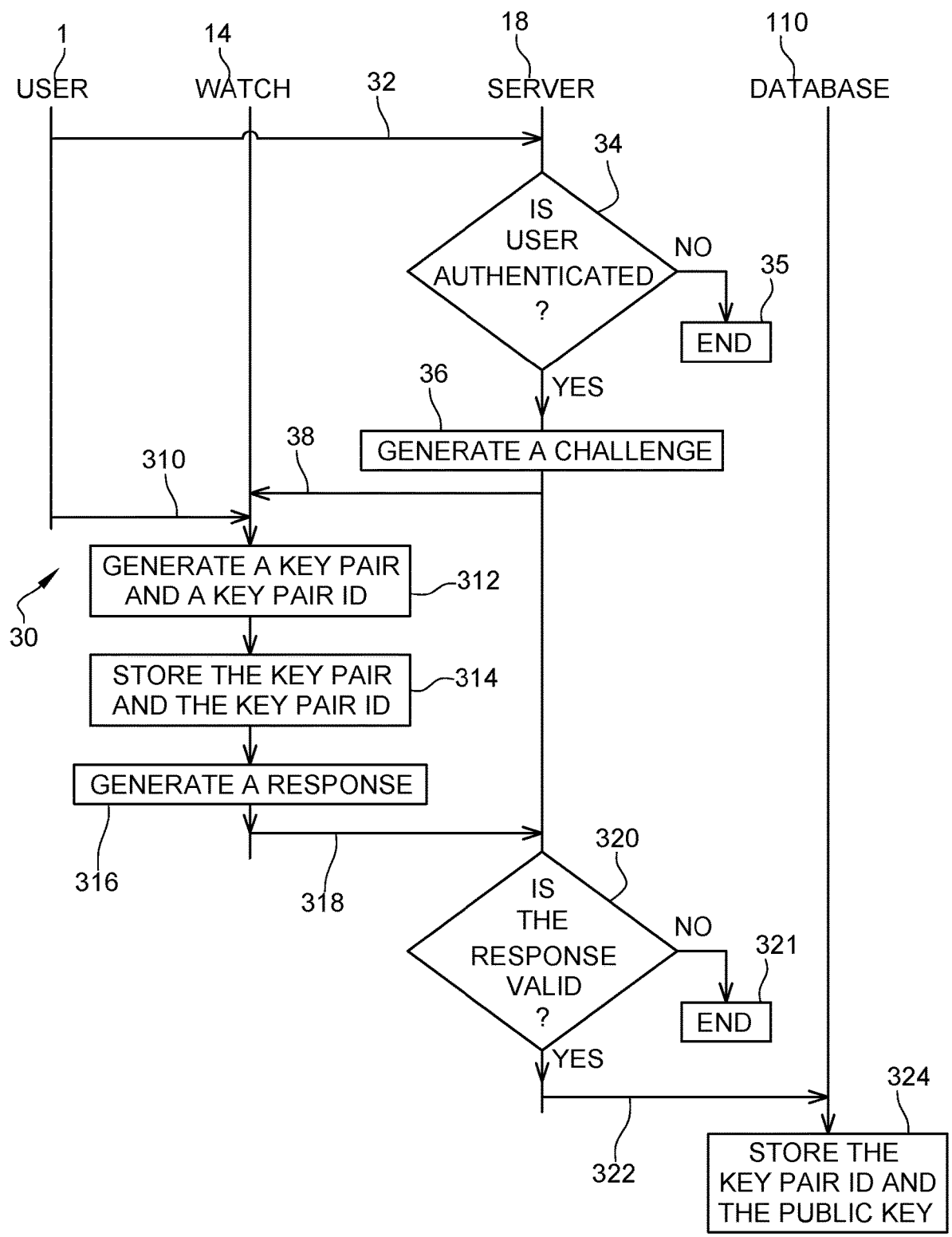
FIG. 3 represents an embodiment of a message flow between the user, the watch and the server of FIG. 1, so that the server registers securely, for a user account, a public key and an identifier relating to a corresponding key pair that are both generated by the watch, according to the invention.

FIG. 3 depicts an exemplary embodiment of a message flow 30 that involves the user 1, the watch 14, the server 18 and the database 110, so as to register, at the server 18 side, a key pair ID and a corresponding public key for the user 1 account.

It is assumed that the user 1 exchanges, through the phone local application or the phone 12 (not represented), with the server 18.

Optionally, the user 1 provides 32, through the phone MMI, a dedicated application or a (web) browser (not represented) supported by the phone 12, via one or two channels, the server 18, with a request to personalize a user account and preferably first user authentication data. The first provided user authentication data may include a user name, a password, an OTP and/or other user authentication credentials.

Once the server 18 has received the first provided user authentication data, the server 18 verifies 34 whether the first provided user authentication data does or does not match first (predetermined) reference user authentication data. The first reference user authentication data is preferably registered in the database 110 for the concerned user account.

If the first provided user authentication data does not match the first reference user authentication data, then the server 18 terminates 35 the launched registration process, so as to forbid the user registration process execution.

Otherwise, i.e. if the first provided user authentication data matches the first reference user authentication data, i.e. if the user 1 is successfully authenticated, the server 18 continues the execution of the launched user registration process. Such a user authentication validation step allows ensuring that the registration is only performed when the user 1 authorizes this latter and is successfully authenticated. The user 1 is therefore involved to authorize to carry out the concerned user registration. To continue the user registration process execution, the server 18 may send to another server or the database 110 a request (not represented) for initializing a user account, so that the database 110 stores a secure asset(s), as a secure data item(s) relating to the user account. The secure asset(s) may be generated by the server 18 or another server connected or coupled to the server 18 and/or the database 110. To continue the user registration process execution, the server 18 generates 36 a challenge, such as e.g., a RaNDom (or RND).

The server 18 sends 38, through the LA 23 (not represented), to the watch 14, a request for personalizing, at the server 18 side, a user account along with the (generated) challenge.

Once the watch 14 has received the challenge, the watch 14 may request (not represented) the user 1 to provide second user authentication data at the watch 14 side, as second reference user authentication data, so as to authenticate.

The user 1 provides 310 preferably the watch 14 with second user authentication data. The second provided user authentication data may include a PIN, biometric data and/or other user authentication credentials.

Once the watch 14 has received the second provided user authentication data, the watch 14 compares (not represented) the second provided user authentication data to second predetermined reference user authentication data. The second reference user authentication data has been preferably registered by the user 1 before (or to) the watch 14 that stores the second reference user authentication data.

If the second provided user authentication data does not match the second reference user authentication data, then the watch 14 terminates (not represented) the launched user registration process.

Otherwise, i.e. if the second provided user authentication data matches the second reference user authentication data, the watch 14 continues the launched user registration process.

Alternately, i.e. instead of authenticating successfully the user, a mere user validation, e.g., by depressing a button or the like, is used to let the user 1 have a control of the execution of the user registration process. The mere user validation proves that the user owns and controls the watch 14.

Once the launched user registration process has been authorized by the watch 14 possibly further to a mere user validation or a successful user authentication by the watch 14, the watch 14 generates 312 a key pair, an associated public key, as a key pair, and an associated key pair ID, such as e.g., an RND.

The watch 14 stores or registers 314, in an associated manner, the private key, the (associated) public key, the (associated) key pair ID and preferably the second reference user authentication data.

Such a local user registration allows associating or combining a local user authentication, when applicable, and an unlocking of the private key to be used for generating a signature, in order to authenticate the user 1. Such a user authentication allows registering the user 1 at the server 18 side and carrying out a secure operation, such as an email decryption, an OTP generation, a signature generation and/or the like, at the user watch 14 side, i.e. locally, that needs to use a secure asset(s) provided, through the LA 23 personalization, from or through the server 18.

Once the watch 14 has registered, in association, the key pair, the pair ID and preferably the second reference user authentication data, the watch 14 generates 316 a response, by using the (received) challenge and the (registered) private key.

Optionally, the watch 14 generates (not represented) an (operator) attestation. To generate the attestation, the watch 14 uses the (received) challenge and a (retrieved) operator private key (previously registered in the watch 14). The operator private key is associated with a corresponding operator public key.

The watch 14 sends 318, through the LA 23 (not represented), to the server 18, the (generated) response, the (registered) public key, the (registered) key pair ID and possibly the (generated) attestation.

If the server 18 receives the attestation, then the server 18 verifies (not represented) whether the (received) attestation does or does not match an operator challenge signature by using the (sent) challenge and the operator public key. The operator public key is received from the watch 14 and/or retrieved by the server 18 that stores or accesses the operator public key.

If the attestation does not match the operator challenge signature, i.e. if the attestation is not valid, then the server 18 terminates (not represented) the execution of the launched user registration process, so as to forbid or deny the user registration process execution.

Otherwise, i.e. if the attestation matches the operator challenge signature, i.e. if the attestation is valid, the server 18 continues the execution of the launched user registration process. The attestation allows proving that the concerned operator attests that the watch 14 is genuine.

Once the server 18 has received the response after having validated, when applicable, the attestation, the server 18 verifies 320 whether the (received) response is or is not valid.

To verify the validity of the (received) response, the server 18 checks whether the response does or does not match a signature, by using the (sent) challenge and the (received) public key. The signature is a signature of the challenge that is performed by the watch 14.

If the response does not match the signature, i.e. if the response is not valid, then the server 18 terminates 321 the execution of the launched user registration process, so as to forbid or deny the user registration process execution.

Otherwise, i.e. if the response matches the signature, i.e. if the response is valid, the server 18 continues the execution of the launched user registration process.

The server 18 carries out a user registration, by registering the (received) key pair ID in association with the (received) public key for the concerned user account. To register the key pair ID in association with the public key, the server 18 sends 322 to the database 110 the key pair ID in association with the public key. The database 110 stores 324, for the concerned user account, the key pair ID in association with the public key. The watch 14 is tied (or linked) to the user 1 and registered, through the key pair ID and the corresponding public key, at the server side, in the concerned user 1 account.

The server 18 informs preferably, through the phone MMI or an MMI accessible through the phone 12, the user 1, about the (successful) user registration at the server 18 side, as a result of the user registration process.

Figure 4:
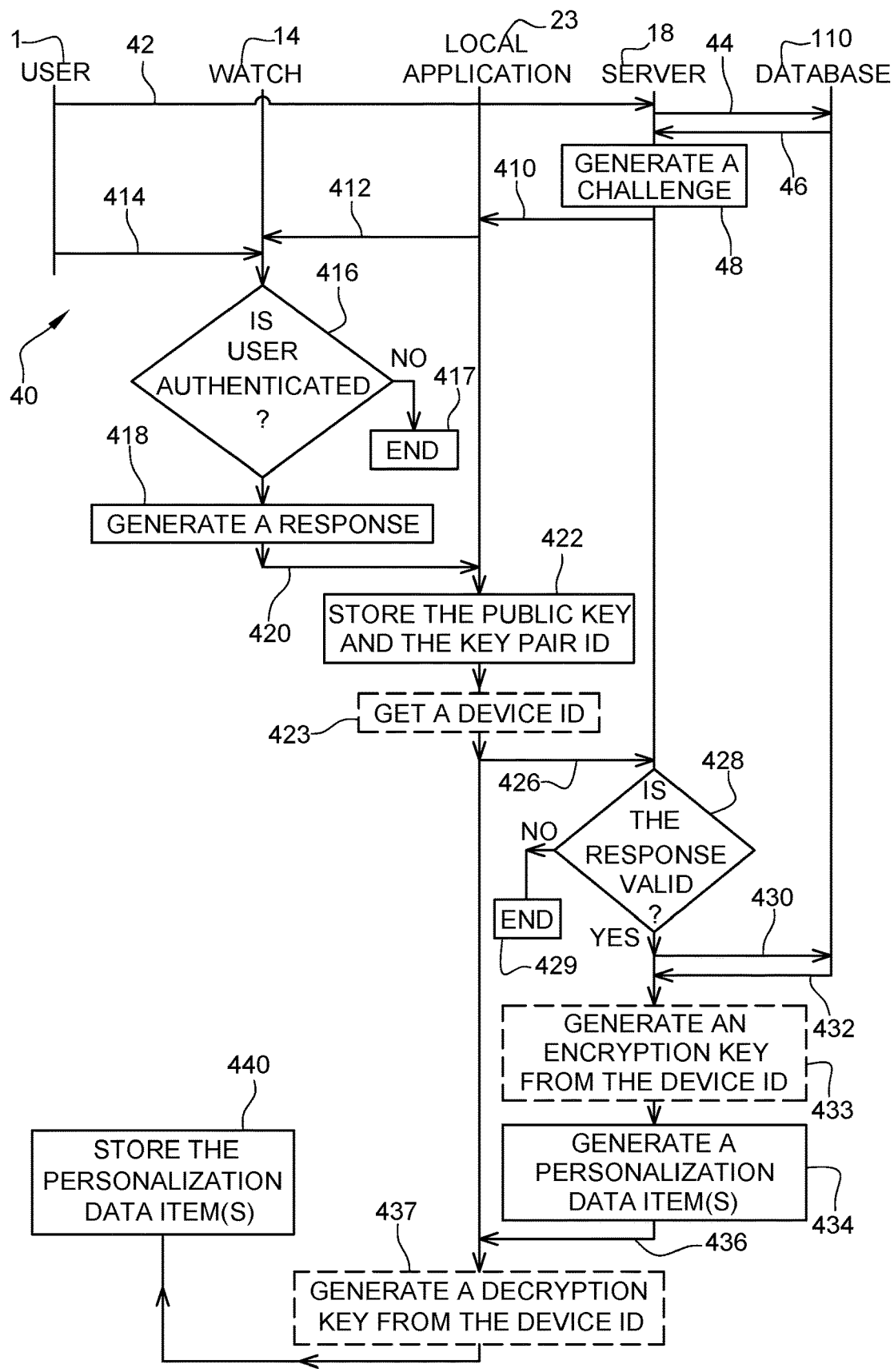
FIG. 4 is an embodiment of a message flow between the user, the local application, the watch and the server of FIG. 3, so that the server sends, to the local application, a personalization data item(s), in order to carry out the operation(s)

FIG. 4 depicts an exemplary embodiment of a message flow 40 that involves the user 1, the watch 14, the LA 23, the server 18 and the database 110, so as to register, at the phone 12 side, at least the key pair ID, the associated public key and a secure asset(s), as personalization data items sent from or through the server 18. It is assumed that the user 1 and the watch 14, as the user authenticator, exchange both, through the LA 23, with the server 18.

The user 1 provides 42, through the LA 23, the server 18, with a request to personalize the LA 23 with data originating from the server 18. The personalization request(s) include(s) or is accompanied with an ID relating to the user 1, such as a user name or an IMSI.

Optionally, the personalization request(s) include(s) or is(are) accompanied with first user authentication data, like e.g., a password or an OTP, provided by the user 1.

When applicable, once the server 18 has received the first provided user authentication data, the server 18 verifies (not represented) whether the first provided user authentication data does or does not match the first predetermined reference user authentication data. The first reference user authentication data is registered in the database 110 for the concerned user account.

If the first provided user authentication data does not match the first reference user authentication data, then the server 18 terminates (not represented) the launched personalization process execution, so as to forbid or deny the user personalization process execution.

Otherwise, i.e. if the first provided user authentication data matches the first reference user authentication data, i.e. if the user 1 is successfully authenticated, the server 18 continues the execution of the launched personalization process. Such a user authentication validation step allows ensuring that the LA 23 personalization is only performed when the user 1 is successfully authenticated and is therefore involved to authorize to carry out the concerned personalization.

To continue the user personalization process execution, the server 18 identifies the concerned user 1 and queries 44 the database 110 to be provided with a (registered) key pair ID and a corresponding (registered) public key for the concerned user account.

The server 18 gets or retrieves 46, preferably in response to the query, the key pair ID and the associated public key. The retrieved public key is to be used by the server 18 for validating a watch 14 signature that is under user 1 control.

Then, the server 18 generates 48 a challenge, such as e.g., an RND.

The server 18 sends 410, to the LA 23, a personalization request along with the (generated) challenge and the (retrieved) key pair ID.

The LA 23 transmits 412, to the watch 14, the challenge and the key pair ID.

The watch 14 may request (not represented) the user 1 to provide second user authentication data.

The user 1 enters and/or submits 414 preferably second user authentication data, such as one or several biometric data items, by putting e.g., one or several fingers on the biometric sensor(s) that is(are) incorporated in or connected or coupled to the watch 14.

Once the watch 14 has received the second provided user authentication data, the watch 14 verifies 416 whether the user 1 is or is not authenticated by comparing the (received) second provided user authentication data to the second reference user authentication data. The second reference user authentication data is registered in a memory relating to the watch 14 (or a device connected or coupled to the watch 14).

If the (received) second provided user authentication data does not match the second reference user authentication data, then the watch 14 terminates 417 the execution of the launched signature process.

Otherwise, i.e. if the second provided user authentication data matches the second reference user authentication data, i.e. if the user is successfully authenticated, the watch 14 continues the execution of the launched signature process by generating 418 a response. The user authentication validation step allows ensuring that the personalization process is only performed when the user is successfully authenticated and is therefore involved to authorize to carry out the concerned personalization process to be executed. Alternately, instead of requiring a successful user authentication, a mere user validation, e.g., by actuating or depressing a button or the like, is used to let the user 1 have a control of the execution of the personalization process.

To generate the response, the watch 14 gets or retrieves, based on the key pair ID, the concerned private key and uses the (retrieved) private key and the (received) challenge.

Optionally, the watch 14 further generates (not represented) an (operator) attestation. To generate the attestation, the watch 14 uses a (retrieved) operator private key (previously registered in the watch 14 or a device connected or coupled to the watch 14), and the (received) challenge. The operator private key is associated with the corresponding operator public key.

The watch 14 sends 420, to the LA 23, the (generated) response that is preferably accompanied with the associated public key and key pair ID. The watch 14 may also send to the LA 23 the attestation.

If the LA 23 receives, from the watch 14, the associated public key and key pair ID, then the LA 23 stores or registers 422 preferably the associated public key and key pair ID. Such a storage of the public key and the associated key pair ID allows the LA 23 to carry out off-line the secure operation. The storage of the public key and the associated key pair ID allows enhancing the security level by protecting notably against an attack against the watch 14 and may allow securing the LA 23 personalization as well.

Once the LA 23 has received at least the response, the LA 23 may get or retrieve 423 a phone ID, as a unique device ID. The device ID allows characterizing, in a unique manner, the phone 12, as the concerned device. The device ID may be generated on-the-fly or pre-generated by the LA 23 by using an HW and/or SW component(s) that is(are) included in the phone 12. The phone ID is a device fingerprint for a use only on the phone 12, e.g., as a secure storage, through the LA 23. The phone ID may be used for generating one or several keys, as at least part of secure assets to be generated.

The LA 23 sends 426, to the server 18, the (received) response that is possibly further personalized with the device ID, i.e. when the LA 23 gets and sends to the server 18 the device ID, and accompanied with optionally the (received) attestation, only when the attestation is present within the data received from the watch 14 by the LA 23.

If the server 18 receives the attestation, then the server 18 verifies (not represented) whether the (received) attestation does or does not match an operator challenge signature by using the (sent) challenge and an operator public key. The operator public key is received from the watch 14 and/or retrieved by the server 18 that stores or accesses the operator public key.

If the attestation does not match the operator challenge signature, i.e. if the attestation is not valid, then the server 18 terminates (not represented) the execution of the personalisation process, so as to forbid or deny to execute the personalisation process.

Otherwise, i.e. if the attestation matches the operator challenge signature, i.e. if the attestation is valid, the server 18 continues the execution of the personalisation process. The attestation allows proving that the concerned operator attests that the watch 14 is genuine.

Once the server 18 has received, from the LA 23, the response after having validated, when applicable, the attestation, the server 18 verifies 428 whether the (received) response is or is not valid.

To verify the validity of the response, the server 18 checks whether the response does or does not match a signature by using the (retrieved) public key and the challenge that has been sent, by the server 18, to the LA 23 (during the session of the pending communication). The signature is a result of a signing, by the watch 14, of the (sent) challenge.

If the response does not match the signature, i.e. if the response is not valid, then the server 18 terminates 429 the execution of the personalisation process, so as to forbid or deny to execute the user personalisation process.

Otherwise, i.e. if the response matches the signature, i.e. if the response is valid, the server 18 continues the execution of the user personalisation process.

Only if the received response matches the signature, the server 18 stores or registers (not represented), for the concerned user account, in association with the (registered) public key and the (sent and registered) key pair ID, the received phone ID, i.e. when the LA 23 has sent to the server 18 the phone ID.

To register the phone ID, the server 18 stores (not represented), in the database 110, for the concerned user account, the phone ID, as a device ID, in association with the (registered) public key and the (registered) key pair ID.

To continue the user personalization process execution, the server 18 identifies the concerned user and queries 430 the database 110 to be provided with the stored user account data, namely, for the concerned user account, the key pair ID, the (associated) public key, a registered secure asset(s), as a predefined secure data item(s), and a device ID, when applicable (i.e. when registered).

Then, the server 18 gets or retrieves 432 the registered key pair ID, the registered public key, the registered secure asset(s) and the registered phone ID (when present, i.e. stored in the database 110).

The server 18 generates 433 preferably an encryption key, as a key derived from the device ID, by using the (received) phone ID, when applicable (i.e. when received from the LA 23). The thus generated encryption key is also unique for the concerned device, namely the phone 12.

Then, the server 18 generates 434 a personalization data item(s), so as to secure an operation to be carried out by the LA 23.

To generate the personalization data item(s), the server 18 combines (e.g., concatenates) preferably the (retrieved) key pair ID, the (retrieved) public key and the (retrieved) secure asset(s). Additionally, to enhance the security, to generate the personalization data item(s), the server 18 further generates one or several keys, as an additional secure asset(s), by using the phone ID, as device ID. The thus generated or derived key(s) is(are) diversified thanks to the device ID. The derived key(s) is(are) therefore unique to the LA 23 to be personalized. The derived key(s), as an additional secure asset(s), may include e.g., a data storage key, a data transport key, a data signature key, a data encryption key and/or (an)other key(s).

To enhance the security, the server 18 encrypts (not represented) the (generated) personalization data item(s) by using the (generated) encryption key.

The server 18 sends 436, to the LA 23, preferably through a secure communication channel, such as e.g., an HTTPs type channel, the (generated) personalization data item(s) that is(are) preferably encrypted with the encryption key.

The LA 23 generates 437 preferably a decryption key, as a key derived from the device ID, by using the (sent) phone ID, when applicable (i.e. when sent to the server 18). The thus generated decryption key is also unique. The LA 23 decrypts (not represented) the (received) encrypted personalization data item(s) by using the (generated) decryption key.

In a preferred manner, when the LA 23 has stored the public key and the associated key pair ID, the LA 23 verifies (not represented) whether the key pair ID and the associated public key obtained from the received personalization data item(s) are or are not both valid. Such a double verification of the (received) key pair ID and public key allows protecting the LA 23 notably against an attack between the LA 23 and the server 18, as a Man-In-The-Middle (or MITM) attack at the server 18 side.

To verify the validity of the key pair ID and public key, the LA 23 compares the key pair ID and the associated public key that are both obtained (e.g., extracted) from the received personalization data items to the key pair ID and the associated public key that are both stored in the LA 23 and that have both been received, by the LA 23, from the watch 14 respectively.

If the received key pair ID and/or the received associated public key (both obtained from the received personalization data item(s)) does(do) not match the stored key pair ID and public key, i.e. if the received key pair ID and/or the received public key is(are) not valid, then the LA 23 terminates (not represented) the execution of the personalisation process, so as to forbid to execute the personalisation process.

Otherwise, i.e. if the received key pair ID and the received associated public key (obtained or extracted from the received personalization data item(s)) match both the stored key pair ID and the associated stored public key respectively, i.e. if the received key pair ID and the received public key are both valid, the LA 23 continues the execution of the personalisation process.

The LA 23 carries out a personalization, by registering the received personalization data item(s). To register the received personalization data item(s), the LA 23 stores 440 the (received) personalization data item(s) that include(s) a secure asset(s). The secure asset(s) is(are) not exposed to outside. The secure asset(s) is(are) to be used for carrying out by the LA 23 a secure operation.

Such an LA 23 personalization involves preferably the watch 14 which requires preferably a successful user authentication, during an initial enrolment or registration of the LA 23. The local user authentication allows securing a provisioning of the secure asset(s) in the LA 23, so as to secure the LA 23 execution.

Once personalized, the LA 23 is strongly bound, to the user 1, through the personalization data item(s) that originate(s) from the server 18 side and that is(are) to be used to carry out, in a secure manner, a local operation(s).

The LA 23 may be provided with a strong anti-cloning capability thanks to the involvement of the watch 14 when the watch 14 requires a successful user authentication to unlock the concerned private key that allows signing a challenge that is issued by the LA 23 and a response of which is firstly verified by the LA 23 prior to its execution.

Figure 5:
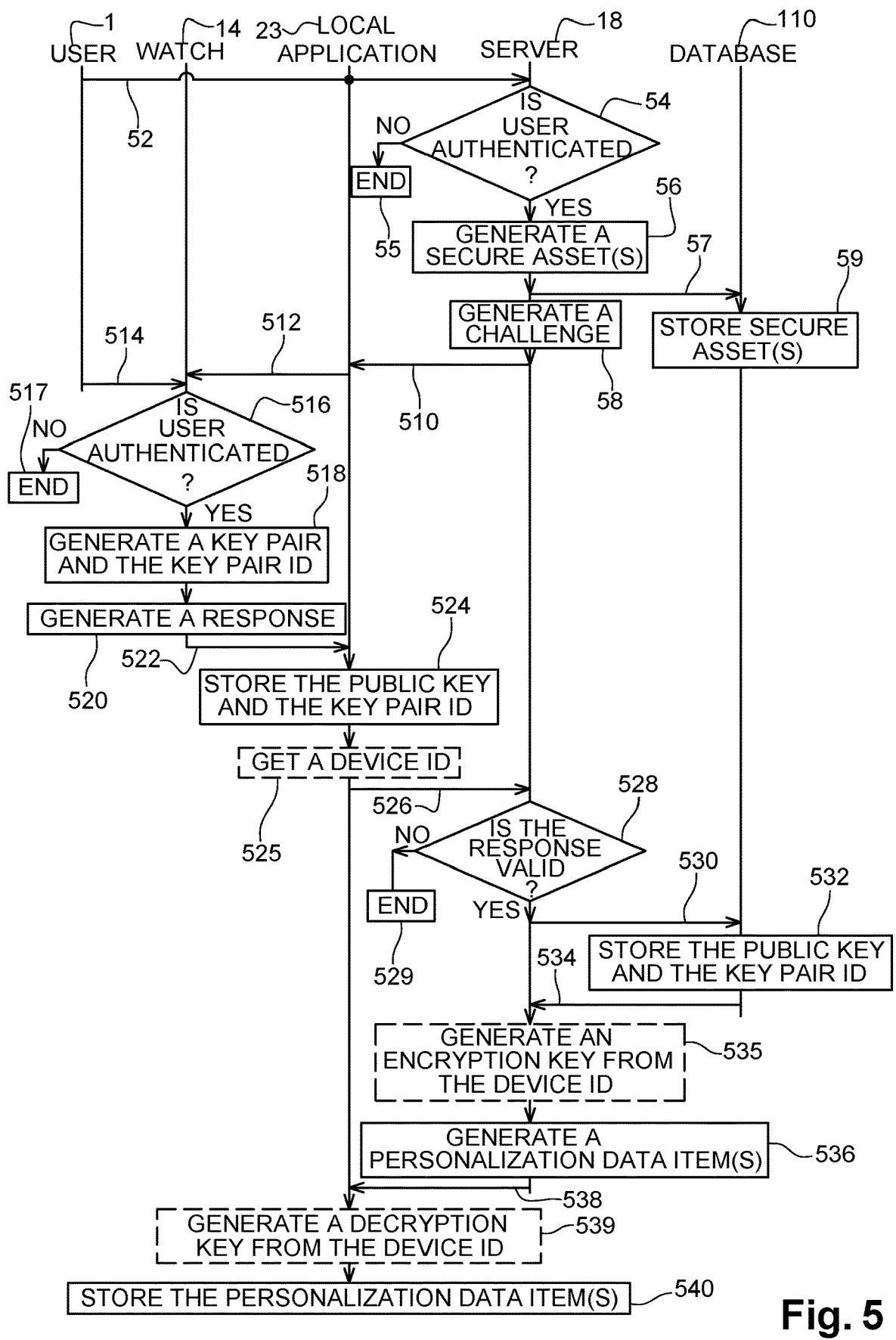
FIG. 5 is another embodiment of a message flow between the user, the local application, the watch and the server of FIG. 3, so that the server sends, to the local application, a personalization data item(s), in order to carry out the operation(s).

FIG. 5 depicts another exemplary embodiment of a message flow 50 that involves the user 1, the watch 14, the LA 23, the server 18 and the database 110, so as to register, at the phone 12 side, at least the key pair ID, the associated public key and a secure asset(s), as personalization data items sent from the server 18.

It is assumed that the user 1 and the watch 14, as the user authenticator, exchange both, through the LA 23, with the server 18.

The user 1 provides 52, through the LA 23, the server 18, with a request to personalize the LA 23 with data originating from the server 18. The personalization request(s) include(s) or is accompanied with an ID relating to the user 1, such as a user name or an IMSI, and first user authentication data, like e.g., a password or an OTP, provided by the user 1.

Once the server 18 has received the first provided user authentication data, the server 18 verifies 54 whether the first provided user authentication data does or does not match the first predetermined reference user authentication data. The first reference user authentication data is registered in the database 110 for the concerned user account.

If the first provided user authentication data does not match the first reference user authentication data, then the server 18 terminates 55 the launched personalization process execution, so as to forbid or deny the user personalization process execution.

Otherwise, i.e. if the first provided user authentication data matches the first reference user authentication data, i.e. if the user 1 is successfully authenticated, the server 18 continues the execution of the launched personalization process. Such a user authentication validation step allows ensuring that the watch14, LA 23 and server 18 personalizations are only performed when the user 1 is successfully authenticated.

To continue the user personalization process execution, the server 18 generates 56 (or lets (an)other entity(ies), such as an HSM type server(s), which is(are) connected or coupled to the server 18, generate) one or several secure assets.

Then, the server 18 and/or the cooperating entity(ies) send(s) 57 to the database 110 the secure asset(s). The database 110 stores 59 the (received) secure asset(s).

The server 18 (or lets another entity, such as a server, which is connected or coupled to the server 18, generate) generates 58 a challenge, such as e.g., an RND.

The server 18 sends 510, to the LA 23, a personalization request along with the (generated) challenge.

The LA 23 transmits 512, to the watch 14, the (received) challenge.

The watch 14 may request (not represented) the user 1 to provide second user authentication data.

The user 1 enters and/or submits 514 preferably second user authentication data, such as one or several biometric data items, by putting e.g., one or several fingers on the biometric sensor(s) that is(are) incorporated in or connected or coupled to the watch 14.

Once the watch 14 has received the second provided user authentication data, the watch 14 verifies 516 whether the user 1 is or is not authenticated by comparing the (received) second provided user authentication data to the second predetermined reference user authentication data. The second reference user authentication data is registered in a memory relating to the watch 14 or a device connected or coupled to the watch 14.

If the (received) second provided user authentication data does not match the second reference user authentication data, then the watch 14 terminates 517 the execution of the launched signature process.

Otherwise, i.e. if the second provided user authentication data matches the second reference user authentication data, i.e. if the user is successfully authenticated, the watch 14 continues the execution of the launched signature process by generating on-the-fly 518 a private key, a corresponding public key and a corresponding key pair ID. Alternately, instead of generating on-the-fly the key pair and the associated key pair ID, the watch 14 unlocks access to a watch 14 memory that stores a previously generated private key, a corresponding previously generated public key and a corresponding previously generated key pair ID.

The watch 14 carries out a personalization, by registering, for the concerned user 1, in association with the private key, the generated public key and the generated key pair ID.

The user authentication validation step allows ensuring that the personalization process is only performed when the user is successfully authenticated and is therefore involved to authorize to carry out the concerned personalization process to be executed. Alternatively, instead of requiring a user authentication, a mere user validation, e.g., by actuating or depressing a button or the like, is used to let the user 1 have a control of the execution of the personalization process.

Once the watch 14 has obtained, i.e. generated or retrieved, the private key, the watch 14 generates 520 a response.

To generate the response, the watch 14 gets or retrieves the (registered) private key and uses the private key and the (received) challenge.

Optionally, the watch 14 further generates (not represented) an (operator) attestation. To generate the attestation, the watch 14 uses a (retrieved) operator private key (previously registered in the watch 14 or a device connected or coupled to the watch 14), and the (received) challenge. The operator private key is associated with the corresponding operator public key.

The watch 14 sends 522, to the LA 23, the (generated) response that is accompanied with the associated public key and the associated key pair ID. The watch 14 may also send to the LA 23 the attestation.

Then, the LA 23 receives, from the watch 14, the associated public key and key pair ID, the LA 23 stores or registers 524 the associated public key and key pair ID.

Once the LA 23 has received the response and the associated public key and key pair ID, the LA 23 may get or retrieve 525 a phone ID, as a unique device ID. The device ID allows characterizing, in a unique manner, the phone 12, as the concerned device. The device ID may be generated on-the-fly or pre-generated by the LA 23 by using an HW and/or SW component(s) that is(are) included in the phone 12. The phone ID is a device fingerprint for a use only on the phone 12, e.g., as a secure storage, through the LA 23.

The LA 23 sends 526, to the server 18, the (received) response that is possibly further personalized, i.e. when the LA 23 gets and also sends to the server 18 the device ID, and accompanied with optionally the (received) attestation, only when the attestation is present within the data received from the watch 14 by the LA 23.

If the server 18 receives the attestation, then the server 18 verifies (not represented) whether the (received) attestation does or does not match an operator challenge signature by using the (sent) challenge and an operator public key. The operator public key is received from the watch 14 and/or retrieved by the server 18 that stores or accesses the operator public key.

If the attestation does not match the operator challenge signature, i.e. if the attestation is not valid, then the server 18 terminates (not represented) the execution of the personalisation process, so as to forbid or deny to execute the personalisation process.

Otherwise, i.e. if the attestation matches the operator challenge signature, i.e. if the attestation is valid, the server 18 continues the execution of the personalisation process. The attestation allows proving that the concerned operator attests that the watch 14 is genuine.

Once the server 18 has received, from the LA 23, the response, the public key and the associated key pair ID, after having validated, when applicable, the attestation, the server 18 verifies 528 whether the (received) response is or is not valid.

To verify the validity of the response, the server 18 checks whether the response does or does not match a signature by using the received public key and the challenge that has been sent, by the server 18, to the LA 23 (during the session of the pending communication). The signature is a result of a signing, by the watch 14, of the (sent) challenge.

If the response does not match the signature, i.e. if the response is not valid, then the server 18 terminates 529 the execution of the personalisation process, so as to forbid or deny to execute the user personalisation process.

Otherwise, i.e. if the response matches the signature, i.e. if the response is valid, the server 18 continues the execution of the user personalisation process.

Only if the received response matches the signature, the server 18 sends 530, to the database 110, a request for registering, for the concerned user account, the (received) public key, the (received) key pair ID and preferably the received phone ID, i.e. when the LA 23 has sent to the server 18 the phone ID, and a request for getting, for the concerned user account, at least the (registered) secure asset(s), as predefined secure data item(s).

The database 110 stores 532, for the concerned user account, in association with the (stored) secure asset(s), the (received) public key and key pair ID, and, when applicable, the (received) phone ID.

The server 18 carries out a personalization, by registering, for the concerned user account, in association with the registered secure asset(s), the received public key, the received key pair ID, and, when applicable, the (received) phone ID.

The database 110 provides 534 the server 18 with at least part of the stored user account data, namely, for the concerned user account, the registered secure asset(s), and a device ID, when applicable (i.e. when registered).

The server 18 generates 535 preferably an encryption key, as a key derived from the device ID, by using the (received) phone ID, when applicable (i.e. when received from the LA 23). The thus generated encryption key is also unique for the concerned device, namely the phone 12.

The server 18 generates 536 a personalization data item (s), so as to secure an operation to be carried out by the LA 23.

To generate the personalization data item(s), the server 18 combines (e.g., concatenates) preferably the (registered) key pair ID, the (registered) public key and the (registered) secure asset(s). Additionally, to enhance the security, to generate the personalization data item(s), the server 18 further generates one or several keys, as an additional secure asset(s), by using the phone ID, as device ID. The thus generated or derived key(s) is(are) diversified thanks to the device ID. The derived key(s) is(are) therefore unique to the LA 23 to be personalized. The derived key(s), as an additional secure asset(s), may include e.g., a data storage key, a data transport key, a data signature key, a data encryption key and/or (an)other key(s).

To enhance the security, the server 18 encrypts (not represented) the (generated) personalization data item(s) by using the (generated) encryption key.

The server 18 sends 538, to the LA 23, preferably through a secure communication channel, such as e.g., an HTTPs type channel, the (generated) personalization data item(s) that is(are) preferably encrypted with the encryption key.

The LA 23 generates 539 preferably a decryption key, as a key derived from the device ID, by using the (sent) phone ID, when applicable (i.e. when sent to the server 18). The thus generated decryption key is also unique. The LA 23 decrypts (not represented) the (received) encrypted personalization data item(s) by using the (generated) decryption key.

In a preferred manner, when the LA 23 has stored the public key and the associated key pair ID, the LA 23 verifies (not represented) whether the key pair ID and the associated public key obtained from the received personalization data item(s) are or are not both valid. Such a double verification of the (received) key pair ID and public key allows protecting the LA 23 notably against an attack between the LA 23 and the server 18, as a MITM attack at the server 18 side.

To verify the validity of the key pair ID and public key, the LA 23 compares the key pair ID and the associated public key that are both obtained (e.g., extracted) from the received personalization data items to the key pair ID and the associated public key that are both stored in the LA 23 and that have both been received, by the LA 23, from the watch 14 respectively.

If the received key pair ID and/or the received associated public key (both obtained from the received personalization data item(s)) does(do) not match the stored key pair ID and public key, i.e. if the received key pair ID and/or the received public key is(are) not valid, then the LA 23 terminates (not represented) the execution of the personalisation process, so as to forbid to execute the personalisation process.

Otherwise, i.e. if the received key pair ID and the received associated public key (obtained or extracted from the received personalization data item(s)) match both the stored key pair ID and the associated stored public key respectively, i.e. if the received key pair ID and the received public key are both valid, the LA 23 continues the execution of the personalisation process.

The LA 23 carries out a personalization, by registering the received personalization data item(s). To register the received personalization data item(s), the LA 23 stores 540 the (received) personalization data item(s) that include(s) a secure asset(s). The secure asset(s) is(are) not exposed to outside. The secure asset(s) is(are) to be used for carrying out by the LA 23 a secure operation.

Such an LA 23 personalization involves preferably the watch 14 which requires preferably a successful user authentication, during an initial enrolment or registration of the LA 23. The local user authentication allows securing a provisioning of the secure asset(s) in the LA 23, so as to secure the LA 23 execution.

Once personalized, the LA 23 is strongly bound, to the user 1, through the personalization data item(s) that originate(s) from the server 18 side and that is(are) to be used, at least in part, to carry out, in a secure manner, a local operation(s).

The invention solution allows authorizing an execution of the local application, as an off-line or an on-line application, that is provisioned securely with a secure asset(s) and that involves preferably a local user authentication, so as to carry out a local and secured operation that uses the provisioned secure asset(s).

The invention solution allows securing, under a user control, an execution of a local operation by using a secure asset(s).

The invention claimed is:

1. A method for securing an execution of a local application, wherein, a first user device storing the local application, the method, performed by at least one electronic processor, comprises the following steps:
   requesting, from a user of the first user device executing the local application, a local authorization by way of a second user device, to execute at least one cryptographic operation off-line using provisioned secure assets with said local application on the first user device, by:

generating, by the first user device, during executing the local application, a first challenge for said local authorization;

sending, from the local application, to the second user device, the first challenge and a predetermined identifier relating to an associated key pair generated in a prior user enrolment or registration phase with an on-line remote server;

retrieving, by the second user device, based on the key pair identifier, a private key;

generating, by the second user device, a first response, by using the first challenge and the private key;

sending, from the second user device to the local application, the first response; and verifying, by the local application, that the first response received matches a first signature-from the first challenge and a public key associated with the key pair identifier, the first signature a signature of the first challenge by the second user device;

upon completing said local authorization steps above, carrying out, by the local application the at least one cryptographic operation off-line using said provisioned secure assets responsive to said verifying, wherein the at least one cryptographic operation is one among a digital signature generation, a digital signature verification, a password generation, a cryptogram generation, a data decryption, a data encryption and a cryptographic transaction.

2. The method according to claim 1, wherein, to generate, by the first user device, the first challenge, the local application uses additional data, the additional data related to the at least one operation, to generate the first challenge;

in addition to the first challenge and the key pair identifier, the local application sends, to the second user device, the additional data;

the second user device generates an enhanced first response, by using the first challenge, the additional data and the private key associated with the key pair identifier;

the second user device sends, to the local application, the enhanced first response;

the local application verifies, the enhanced first response received matches an enhanced first signature, by using the first challenge, the additional data and the public key associated with the key pair identifier, the enhanced first signature a signature of the first challenge and the additional data by the second user device; and the local application carries out the at least one operation responsive to said verifies.

3. The method according to claim 2, wherein, prior to executing the local application, the method further includes the following steps:

requesting, from the first user device to a server, to personalize a user account;

sending, from the first user device to the server, a provided first user authentication data;

verifying, by the server, the provided first user authentication data matches a predetermined first reference user authentication data;

generating, by the server, a second challenge responsive to said verifying of the provided first user authentication data;

sending, from the server, through the local application, to the second user device, the second challenge;

generating, by the second user device, the at least one private key, the at least one associated public key and the at least one identifier relating to the associated key pair;

generating, by the second user device, a second response, by using the second challenge and the private key associated with the key pair identifier;

sending, from the second user device, through the local application, to the server, the second response, the public key and the associated key pair identifier;

verifying, by the server, the received second response matches a second signature, by using the second challenge and the received public key, the second signature a signature of the second challenge by the second user device; and registering, by the server the received public key in association with the received key pair identifier responsive to said verifying of the received second response.

4. The method according to claim 2, wherein, prior to executing the local application, the method further includes the following steps:

generating, by a server, a third challenge;

sending, from the server through the local application to the second user device, the third challenge and the key pair identifier;

generating, by the second user device, a third response, by using the third challenge and the private key associated with the key pair identifier;

sending, from the second user device to the local application, the third response, the public key and the associated key pair identifier;

registering, by the local application, the public key and the associated key pair identifier;

sending, from the local application to the server, the third response;

verifying, by the server, the received third response matches a third signature, by using the third challenge and the registered public key, the third signature a signature of the third challenge by the second user device;

generating, by the server at least one personalization data item responsive to said verifying, by using the registered key pair identifier, the associated registered public key and at least one predetermined secure data item;

sending, from the server to the local application, the at least one personalization data item; and registering, by the local application, the at least one personalization data item.

5. The method according to claim 4, wherein, in addition to sending, from the second user device through the local application to the server, the third response, the second user device sends, through the local application, to the server, the key pair identifier and the associated public key, and the local application registers the key pair identifier and the associated public key.

6. The method according to claim 5, wherein the local application verifies whether the key pair identifier and the associated public key both received from the server do or do not match the key pair identifier and the associated public key both stored by the local application respectively and, only if the key pair identifier and the associated public key both received from the server match the key pair identifier and the associated public key both stored by the local application respectively, the local application registers the at least one personalization data item.

7. The method according to claim 6, wherein the second user device accessing a private key relating to an operator, the server accessing a public key relating to the operator, the method further includes the following steps:

generating, by the second user device, a third attestation, by using the third challenge and the operator private key, the operator private key associated with the operator public key;

sending, from the second user device through the local application to the server, in addition to the third response, the third attestation;

verifying, by the server, the received third attestation matches a third operator challenge signature, by using the third challenge and the operator public key, the third operator challenge signature a signature of the third challenge by the second user device, as attested as genuine by the operator; and generating, by the server the at least one personalization data item responsive to said verifying.

8. The method according to claim 2, wherein, prior to executing the local application, the local application storing a unique identifier relating to the first user device, the method further includes the following steps:

requesting, from the second user device, through the local application, to a server, to personalize a user account while sending provided first user authentication data;

verifying, by the server, the provided first user authentication data matches predetermined first reference user authentication data;

generating, by the server at least one secure data item and a fourth challenge responsive to said verifying of said provided first user authentication data;

registering, by the server, the at least one secure data item;

sending, from the server, through the local application, to the second user device, the fourth challenge;

generating, by the second user device, the private key, the associated public key and the identifier relating to the associated key pair;

generating, by the second user device, a fourth response, by using the fourth challenge and the private key;

sending, from the second user device to the local application the fourth response, the public key and the associated key pair identifier;

registering, by the local application, the public key and the associated key pair identifier;

retrieving, by the local application, the first user device identifier;

sending, from the local application to the server, in addition to the fourth response, the public key, the associated key pair identifier, the first user device identifier;

verifying, by the server, the received fourth response matches a fourth signature, by using the fourth challenge and the received public key, the fourth signature a signature of the fourth challenge by the second user device;

registering, by the server the received public key responsive to said verifying of said received fourth response, the received key pair identifier in association with the at least one secure data item;

generating, by the server, at least one personalization data item responsive to said verifying of said received fourth response, by using the registered key pair identifier, the associated registered public key, the first user device identifier and the at least one registered secure data item;

sending, from the server to the local application, the at least one personalization data item; and registering, by the local application, the at least one personalization data item.

9. A system for securing an execution of a local application, comprising:

a first user device; and a second user device communicatively coupled to said first device, wherein the first user device for securing an execution of the local application and comprising means for storing the local application is configured to:

request from a user of the first user device a local authorization by way of the second user device, to execute, by the local application, at least one cryptographic operation off-line using provisioned secure assets with said local application on the first user device;

generate, during executing the local application, a first challenge for said local authorization;

send, from the local application to the second user device, the first challenge and a predetermined identifier relating to an associated key pair generated in a prior user enrolment or registration phase with an on-line remote server;

receive, from the second user device to the local application, a first response;

verify, by the local application, the received first response matches a first signature, by using the first challenge and a public key associated with the key pair identifier, the first signature a signature of the first challenge by the second user device; and upon completing said local authorization steps above, carry out, by the local application, the at least one cryptographic operation off-line using said provisioned secure assets responsive to said verifying, wherein the at least one cryptographic operation is one among a digital signature generation, a digital signature verification, a password generation, a cryptogram generation, a data decryption, a data encryption and a cryptographic transaction.

10. A system for securing an execution of a local application, comprising:

a first user device; and a second user device communicatively coupled to said first device, wherein, the system if configured to prior to executing the local application, requesting, from the first user device to a server, to personalize a user account;

sending, from the first user device to the server, a provided first user authentication data;

verifying, by the server, the provided first user authentication data matches a predetermined first reference user authentication data;

generating, by the server a second challenge responsive to said verifying of the provided first user authentication data;

sending, from the server, through the local application, to the second user device, the second challenge;

generating, by the second user device, the at least one private key, the at least one associated public key and the at least one identifier relating to the associated key pair;

generating, by the second user device, a second response, by using the second challenge and the private key associated with the key pair identifier;

sending, from the second user device, through the local application, to the server, the second response, the public key and the associated key pair identifier;

verifying, by the server, the received second response matches a second signature, by using the second challenge and the received public key, the second signature a signature of the second challenge by the second user device; and registering, by the server the received public key in association with the received key pair identifier responsive to said verifying of the received second response.

* * * * *